June 24, 1941.  G. HERBSTER  2,246,994

FILTER FOR GASEOUS MEDIA

Filed Sept. 12, 1939

INVENTOR.
GEORGE HERBSTER

BY

HIS  ATTORNEY.

Patented June 24, 1941

2,246,994

UNITED STATES PATENT OFFICE 2,246,994

FILTER FOR GASEOUS MEDIA

George Herbster, Cleveland, Ohio

Application September 12, 1939, Serial No. 294,476

6 Claims. (Cl. 183—75)

This invention relates to filters for gaseous media and particularly to an air filter for use in connection with household air conditioning apparatus.

Heretofore, filters have been provided for filtering air preparatory to its passage into heat exchanging relation to a heat exchanger or its passage into a space to be heated, cooled or otherwise conditioned. Generally, such filters comprise spaced perforate retainer members with more or less matted filter material therebetween, or corrugated sheets of paper. In the case of the latter, the sheets are arranged with their corrugations in slightly spaced but somewhat nesting relation, or otherwise so arranged as to define a large number of serpentine or tortuous but parallel paths for the air which can be passed between the sheets, as for instance, transversely of the corrugations, when spaced in the somewhat nesting relationship. As a result of such arrangements of corrugated sheets, the air is brought into close contact with the surfaces of the sheets. The sheet surfaces usually are oiled so that any foreign matter suspended in the air comes in contact with the oiled surfaces and adheres thereto at some time or other during the passage of the air through the filter. Such filters, however, have several objections, one of which is the fact that the paths for the air are such that quite a large number of dead air pockets or spaces are formed and the surface of the sheets at such spaces is relatively ineffective for filtering the passing air. Another disadvantage, in common with the mat type heretofore mentioned, is that the surfaces which provide the tortuous passages cause a material retardation in the rate of flow of the air so that a relatively large filter or large blower is required in order to permit passage of sufficient volumes of air for the intended purposes.

One of the principal objects of the present invention is to provide a filter which affords a relatively free passage for the air therethrough while at the same time effecting contact of all of the air with oiled wall surfaces which are capable of extracting from the air any foreign matter suspended therein.

Other objects are to assure contact of all of the air passing through the filter with the wall surfaces, while providing greater filtering efficiency and at the same time affording passage of larger amounts of air in proportion to the size of the filter.

Another object is to cause the air flowing through the filter to diffuse throughout a large area thereof and alternately increase and decrease in velocity during its travel.

Another specific object is to provide an air filter which is relatively inexpensive to manufacture and simple in construction, operation, and maintenance.

Other objects and advantages will become apparent from the following specification, wherein reference is made to the drawing, in which.

Figure 1:
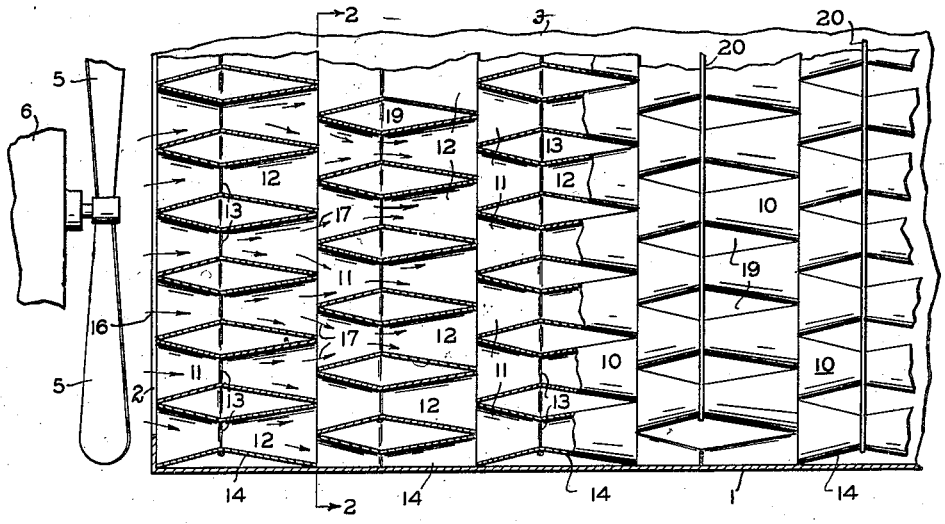
Fig. 1 is a fragmentary vertical section through an air filter embodying the present invention and is taken on a plane indicated by the line 1—1 of Fig. 2, parts thereof being shown in elevation for clearness in illustration.

Referring to the drawing, the filter may comprise a sheet metal cabinet which has a base 1 and is open at one end, as indicated at 2, for admission of air or gaseous media to be filtered. The cabinet has imperforate side walls 3 and a top wall. Means are provided to force air through the casing endwise. In the form illustrated, this is shown as accomplished by a fan 5 driven by a suitable motor 6. However, when the filter is used in connection with other apparatus, the air may be drawn therethrough by sub-atmospheric pressure at the discharge end of the filter by the apparatus customarily provided in connection with air conditioning and heating equipment, either of the forced or gravity air flow type.

Figure 4:
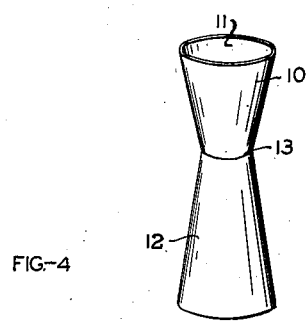
Fig. 4 is an enlarged perspective view of one of the filter elements of the present invention.

Mounted within the casing are a plurality of filter elements in the form of Venturi tubes 10 which are better illustrated in Fig. 4. The tubes 10 may be formed of light gauge sheet metal or paper, and the surfaces thereof are coated with a light film of oil. The tubes have relatively short inlet portions 11 and longer discharge portions 12 and are of Venturi shape, the inlet portion 11 and discharge portion 12 being contracted in cross section toward their common Venturi throat 13. The tubes 10 may be circular in cross section and are arranged in tiers 14, which may be coextensive with the cabinet in width, or in narrower sections, as desired.

Figure 5:
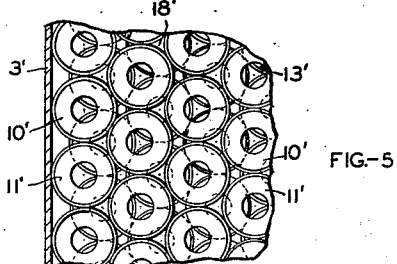
Fig. 5 is a view similar to Fig. 2 but illustrating a modification of the invention.

Each tier 14 comprises a plurality of vertical rows 15 of horizontally disposed tubes 10, the tubes of each row being aligned vertically with each other. The tubes of each row are staggered with respect to the tubes of the laterally adjacent rows of the same tier, as better illustrated in Fig. 2. Likewise, the tubes of each row are staggered vertically with respect to the tubes of an adjacent row of adjacent tiers so that the axis of each tube in each tier is vertically midway between the axes of adjacent tubes in the next tier. Accordingly, the air passing through the filter is brought into intimate contact with both the inner and outer walls of the tubes 10. If desired, the rows of each tier additionally may be staggered relative to the adjacent rows of the adjacent tiers so that the axis of each tube of one tier is spaced equidistant from the point of tangency of the nearest tubes of the adjacent tiers. Such an arrangement is illustrated in Fig. 5, wherein parts corresponding to those described are illustrated by corresponding primed numerals.

Figures 2, 6:
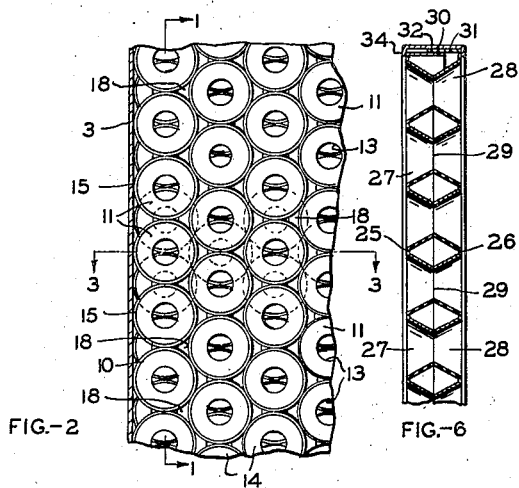
Fig. 2 is a fragmentary vertical sectional view taken on a plane indicated by the line 2—2 in Fig. 1.
Fig. 6 is a transverse sectional view through a single air filtering unit of modified form.
Figure 3:
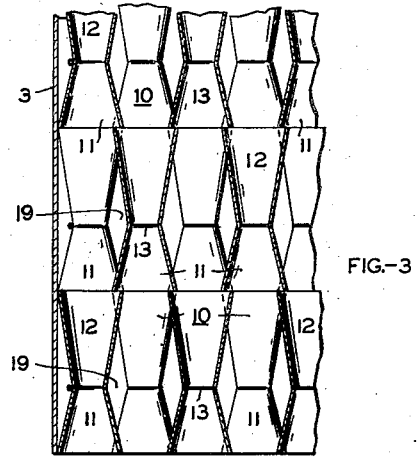
Fig. 3 is a fragmentary horizontal sectional view taken on a plane indicated by the line 3—3 in Fig. 2.

Referring particularly to Figs. 1 and 2, air entering any one tube 10, as indicated by the arrows 16, is caused to increase in velocity as it approaches the throat 13 of the tube which it has entered. At the same time, it is brought more intimately in contact with the inner wall surfaces of the portion 11 of the tube. Thereupon it passes, as indicated by the arrows 17, out of the expanding portion 12 of the tube, and since the tube is in Venturi shape, this is accomplished without any appreciable loss in velocity head or pressure head. This air passes in intimate contact with the inner walls of the portion 12 during expansion beyond the throat 13 of the tube which it has entered. The air from this tube divides, and equal amounts of a portion thereof pass through the horizontally aligned but vertically offset tubes of the next succeeding tier, as indicated by the arrows 17, wherein it is subjected to a repetition of the operation heretofore described.

Likewise, equal amounts of the remaining portion of the air pass through the openings defined between the tubes 10, as indicated at 18. The portion of the air passing between the tubes 10 starts at relatively high velocity, due to the restricted size of the entrance openings 18 therebetween, and then decreases in velocity as it approaches the zone of the throats 13 because the space defined by the outer surfaces of the walls of the adjacent tubes, as indicated at 19, is larger than the openings 18. As the air leaves the spaces 19, it again passes through openings which are similar to the openings 18 and are restricted relative to the spaces 19. Thus its velocity is again changed. By virtue of this arrangement the air from each tube is divided and redivided and thus diffused throughout the filter and the air flows with a series of alternate or successive increases and decreases in velocity. Furthermore, a large volume of air can be passed through the filter without the necessity of excessive pressure since the resistance to flow is relatively low.

The individual tiers of tubes form filter unit sections which, preferably, are self sustaining in unitary form. These units may extend the full width of the cabinet 1 and the tubes of each tier may be bound together by a suitable wire, such as indicated at 20. Each tier or filter unit section is removable independently of adjacent tiers or section units. Since the filter elements nearest the fan or entrance end tend to collect foreign matter more rapidly than those nearer the discharge end, the device can be operated most economically by removing the tier nearest the fan, moving the remaining tiers toward the fan and placing a new tier at the discharge end. If the tubes are made of ordinary paper or other inexpensive and readily destructible material, the removed tier can, economically, be disposed of as by burning. If, however, the tubes are made of metal or stable materials such as hard pressed paper or plastics, then they may be cleaned readily by removing the sections and washing them in gasoline or other appropriate solvent for the fluid film thereon, re-coating them with such fluid and replacing.

Instead of making the self-sustaining sections as assemblies of complete Venturi tubes, the tubes of the individual unit sections can constitute parts only of such complete Venturi tubes as though each tier illustrated were divided into two separate self-sustaining units along the common plane of the restricted portions of the Venturi tubes. Such two units would then be used as matched pairs, complementing each other.

Further illustrative of the ideas expressed in the next preceding paragraph, Fig. 6 shows two spaced members 25 and 26 which may comprise paper stock in sheet form from which are formed, as by coacting dies, closely spaced sets of complementary Venturi tube portions 27 and 28. These tube portions of the two body sheets 25 and 26 may be of different lengths for full venturi effect or the tube portions of both sheets may be identical. In any event, the same number and arrangement of tube portions 27 and 28 are formed on each body sheet 25 and 26 so that the tube portions will register throughout a complete filter unit or section and, when brought together, form complete Venturi tubes therethrough. As shown, the tube portions simply abut along respective joint lines 29. They may, however, telescope slightly for insuring alignment and lateral seal.

The two members 25 and 26 may have peripheral flanges 30 and 31 overlapped as shown at 32, like the side wall and cover of an ordinary paper box, and the flanges of the two members may be secured together as by gluing or in some other convenient manner. The flanges could be continuous about the unit or section or on opposite sides only.

Since the members 25 and 26 are preferably of fairly light paper stock oiled or otherwise treated for enhancing the dust retaining character of the tube interiors, the unit shown in Fig. 6 may require a reinforcing frame extending peripherally about it as indicated at 34. This may also be made from a channel shaped strip of paper with the flanges overlapping the outer marginal portions of the filter unit section.

The tubular portions 27 and 28 and the flanges 30 and 31 may be formed from sheet stock while the latter is advanced continuously as from a roll through rotary forming dies. The stock is preferably oiled before forming the tubular portions in order to prevent fracture of the paper. Other sheet material than paper can, of course, be used for the arrangement shown by Fig. 6, paper being preferred because of its low cost. Openings can be punched through the sheet stock between groups of tube elements 27 and 28, the same functioning as to the gaps 18 and 18' previously described.

I claim:

1. A filter unit comprising a plurality of tiers of approximately parallel tubes which are open at both ends, said tiers being arranged relative to each other so that air passed through and discharged from tubes of one tier can enter tubes of an adjacent tier without substantial change in direction of air movement, the tubes of each tier offset from the tubes of an adjacent tier, said tubes individually, being of restricted cross sectional area between their ends and of gradually enlarging area toward said ends, the principal planes of the tiers being transverse to the longitudinal axes of the tubes.

2. A filter unit comprising a plurality of sections which are relatively broad in one plane in two dimensions and narrow in a plane normal thereto arranged with their broad sides adjacent each other and each having a multiplicity of walls spaced apart and extending approximately normal to the broad sides of the sections, said walls providing a multiplicity of passages through the sections, each of which passages has a constricted portion intermediately of the opposite broad sides of its section and gradually expanding portions toward respective broad sides thereof, said constricted portions lying closer to one broad side than the other.

3. A filter unit comprising spaced parallel sheets with converging tubular elements struck therefrom and in mutual contact at the smaller ends of the elements to provide Venturi tubes through the unit.

4. A portable self-contained filter unit section comprising a body which in two dimensions is relatively broad and in the third dimension relatively narrow, said body thereby presenting opposite broad sides and perimetral narrow sides, and wall elements extending approximately normal to the broad sides and providing a multiplicity of passages leading from one broad side to the other, said passages being of restricted transverse area intermediately of the broad sides and gradually enlarged transverse area toward both broad sides from the region of restriction.

5. A filter unit for gaseous media comprising a plurality of sections which are relatively broad in one plane in two dimensions and narrow in a plane normal thereto, said sections being arranged with their broad sides adjacent each other and each having a plurality of tubes which are constricted intermediately of their ends and of gradually expanding open area toward their opposite ends, said tubes being open at both ends and extending approximately normal to the broad sides of the sections, the tubes of one section being so related to the tubes of an adjacent section that tubes of one section can individually discharge the gaseous media directly into open ends of a plurality of tubes of the adjacent section.

6. A filter unit comprising a section having opposite sides which are broad in two dimensions and perimetral narrow sides, and thin walled tubes in parallel arrangement, providing a multiplicity of passages leading from broad side to broad side which are restricted at points between the ends of the passages, and providing between adjacent tubes additional passages through said body from one broad side to the other.

GEORGE HERBSTER.